United States Patent [19]
Bowling

[11] Patent Number: 5,836,605
[45] Date of Patent: Nov. 17, 1998

[54] TRAILER AND APPARATUS FOR RESTRAINING COIL STOCK

[76] Inventor: Donald Keith Bowling, 8050 Wayne Rd., Wayne, Ohio 43466

[21] Appl. No.: 619,152

[22] Filed: Mar. 21, 1996

Related U.S. Application Data

[63] Continuation of Ser. No. 266,009, Jun. 27, 1994, abandoned.

[51] Int. Cl.[6] ........................................ B60P 9/00
[52] U.S. Cl. ...................... 280/789; 280/769; 410/50; 105/382
[58] Field of Search ................................ 280/400, 656, 280/789, 760, 769; 296/43, 182; 105/380, 382, 390, 362; 410/42, 47, 49, 50, 97, 156

[56] References Cited

U.S. PATENT DOCUMENTS

| | | | |
|---|---|---|---|
| 2,622,918 | 12/1952 | Staffe | 410/50 X |
| 2,682,426 | 6/1954 | Staffe | 410/49 |
| 3,481,627 | 12/1969 | Felburn | 410/50 |
| 3,740,073 | 6/1973 | Schwiebert | 410/47 |
| 3,807,759 | 4/1974 | Vornberger | 410/50 |
| 3,829,148 | 8/1974 | Stoneburner | 410/49 |
| 4,102,274 | 7/1978 | Feary et al. | 410/50 |
| 4,315,707 | 2/1982 | Fernbach | 410/49 X |
| 5,336,027 | 8/1994 | Paddock | 410/49 |
| 5,476,348 | 12/1995 | Shelleby | 410/49 |

Primary Examiner—Richard M. Camby
Assistant Examiner—Victor E. Johnson
Attorney, Agent, or Firm—Brinks Hofer Gilson & Lione

[57] ABSTRACT

A improved trailer for transporting large round coil stock. The trailer includes a platform having opposed front and rear portions and a pair of opposed sides, and a frame fastened to the platform and cooperatively supported by axles, wheels and suspension equipment. The frame has at least two parallel beams interconnected by cross beams and a plurality of brackets attached at spaced intervals along the length of the parallel beams. Each bracket includes a support member having an opening adapted to receive a removable post. A cross piece block is positioned between the coil stock and two or more removable posts which are inserted within the opening at equal distances from a front portion of the trailer to restrain forward movement of the coil stock.

11 Claims, 4 Drawing Sheets

TRAILER AND APPARATUS FOR RESTRAINING COIL STOCK

This application is a continuation of application Ser. No. 08/266,009 filed on Jun. 27, 1994 and now abandoned.

FIELD OF THE INVENTION

This invention relates to an improved trailer including an apparatus for restraining coil stock on the trailer. More particularly, this invention relates to an improved trailer to be pulled by a tractor trailer truck and which is useful for transporting and restraining large round coil stock and preventing the stock from shifting forward during hard breaking situations.

BACKGROUND OF THE INVENTION

This invention is concerned with an improved trailer for transporting and restraining large round coil stock on a trailer, particularly, steel coil stock. It will be appreciated that steel sheeting is transported as coil stock primarily for economy and ease of bulk transport. It will further be appreciated that the transportation of the large round coil stock on a trailer requires special handling considerations that are different from most other types of goods typically transported on a trailer. For example, in addition to the obvious weight and trailer loading considerations for large round coil stock, special consideration must also be given to the shape of the coil stock. Because the coil stock has rounded surfaces the coil stock can easily roll. Accordingly, if the coils are not securely restrained on the trailer they may easily dislodge and roll freely thereby causing damage to person and property. The problem of the coil stock rolling freely from a trailer is particularly acute during hard braking situations when the stock may easily shift forward and strain the securing devices. Further, even when the coils are securely restrained on the trailer, care must also be exercised to insure that the coils do not rock back and forth on their rounded surfaces thereby building up momentum which might strain the securing devices.

In addition to those considerations previously described, consumers of steel coils have demanded that the coils can be shipped without damage so that the coils can be unloaded and set up at the last minute in a manufacturing operation. The steel coils are quite massive and are typically supported on a side or on a curved surface of the coil. Due to the mass of the coil, this results in a relatively high pressure being applied to local portions of the steel coil, which is amplified as the coil shifts or rocks during transport. In view of the foregoing, it will be appreciated that considerable attention has been given to the special handling required for steel coils and an improved trailer has been sought.

Accordingly, one aspect of the present invention is to provide an improved trailer for transporting large coil stock. Another aspect of the present invention is to provide a trailer for transporting large coil stock on a curved surface of the coil. Yet another aspect of the present invention is to provide a method of securing large coil stock on a curved surface of the coil on a trailer. Still another aspect of the present invention is to provide a method of securing large coil stock on a curved surface of the coil on a trailer to prevent the coil from rocking back and forth or shifting forward during hard breaking situations. Another aspect of the present invention is to provide an improved trailer for transporting large coil stock that is simple and economical to manufacture.

SUMMARY OF THE INVENTION

Briefly, according to this invention, there is provided an improved trailer to be pulled by a tractor trailer truck for transporting large round coil stock and an apparatus for restraining a coil stock on the trailer. The trailer includes a platform having opposed front and rear portions and a pair of opposed sides, and a frame fastened to the platform and cooperatively supported by axles, wheels and suspension equipment. The frame has at least two parallel beams interconnected by cross beams. The trailer also includes a plurality of brackets attached at spaced intervals along the length of the parallel beams. Each bracket includes a support member having an opening adapted to receive a removable post. The opening central axis is generally perpendicular to the plane of the platform. A cross piece block is positioned between the coil stock and two or more removable posts which are inserted within the opening at equal distances from a front portion of the trailer to restrain forward movement of the coil stock. The trailer further includes a means for restraining lateral movement of the coil stock.

In one embodiment, the restraining means includes a strap having a wedge shaped member on each end thereof below the coil stock and a block having a complimentary round edge to receive the rounded coil surface. The block is positioned between the wedge shaped member and the round coil surface on each side of the coil stock thereby forming a cradle to receive the coil stock.

In yet another embodiment, the restraining means includes a recess within a central surface area of the platform from the front portion of the platform to the rear portion of the platform. A block having a complimentary round edge to receive the rounded coil surface is positioned against a corner formed within the recess between the elevated outer side area of the platform and the central area of the platform on each side of the coil stock to form a cradle to receive the coil stock.

To secure the coil stock to the platform a plurality of chain lengths pass through a cylindrical opening within the coil stock and each end of the chain length is secured to the platform.

BRIEF DESCRIPTION OF THE DRAWINGS

Further features and other aspects of the invention will become clear from the following detailed description made with reference to the drawings in which.

DESCRIPTION OF THE PREFERRED EMBODIMENTS

Figure 1:
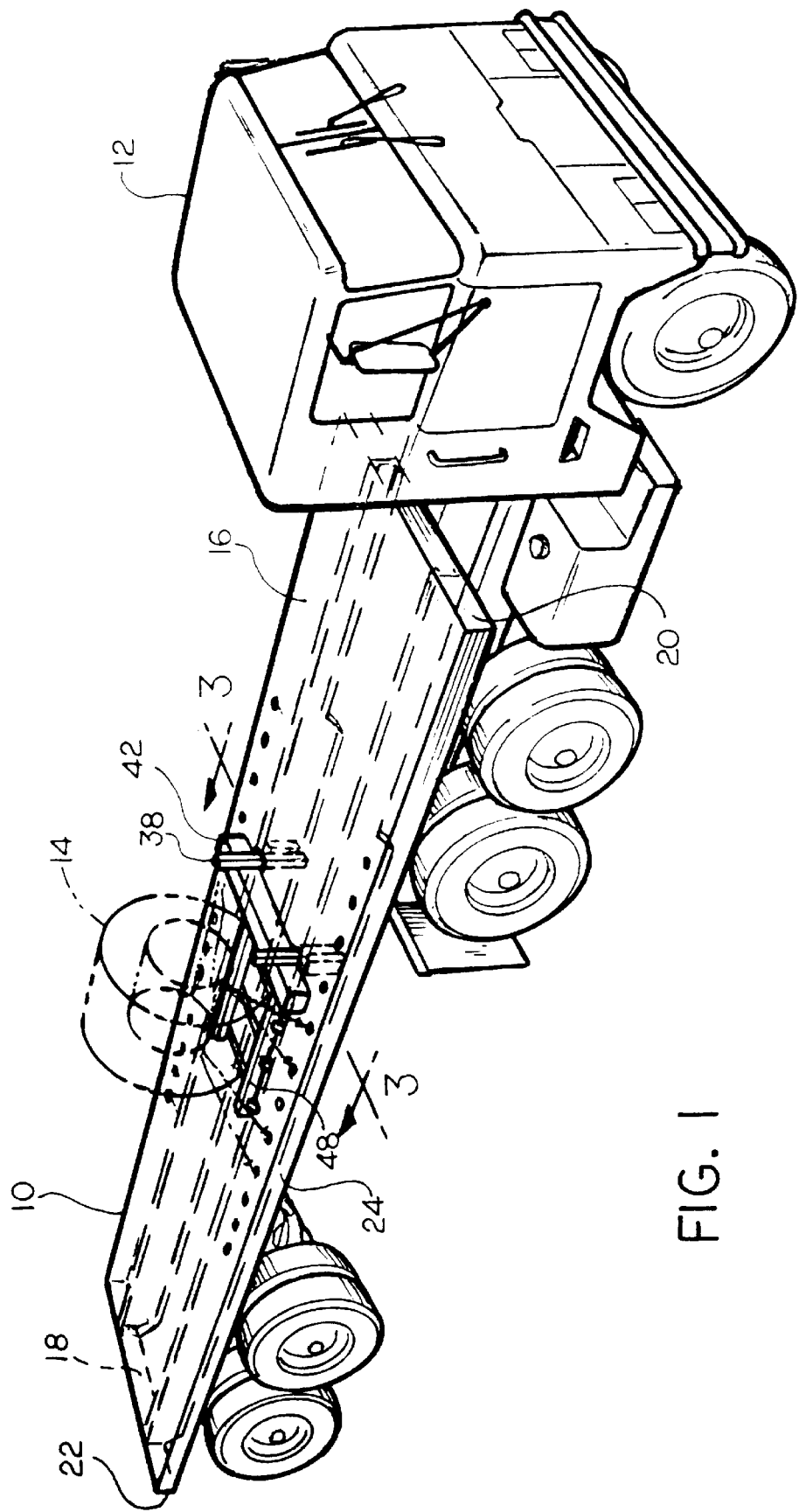
FIG. 1 is a perspective view of a tractor trailer truck and an improved trailer including the features of the present invention for transporting a steel coil stock.

In the following description, like reference characters designate like or corresponding parts. Also, in the following description, it is to be understood that such terms as "forward", "rearward". "left", "right" and the like refer to the illustrations in the drawings and are words of convenience. Such terms should not be so construed as to imply a necessary positioning of the structure or portions thereof or to limit the scope of this invention.

Referring to the figures, a trailer 10 is shown attached to a tractor trailer truck 12. The tractor trailer truck 12 may be of most any type typically utilized to pull a large trailer for transporting a heavy load such as steel coil stock 14. The trailer 10 includes a conventional arrangement for attachment to a fifth wheel of the tractor trailer truck and conventional axles, opposed sets of wheels and related suspension equipment as well known in the art.

The trailer 10 further includes a platform 16 on which the heavy load, e.g., coil stock 14, is placed and a frame 18 supporting the platform. In accordance with the present invention any number of coil stock may be transported, depending upon the weight and size of the coil stock 14 and size and weight capacity of the trailer 10. The coil stock 14 is preferably placed on the trailer platform 16 with the central axis of a cylindrical opening of each coil parallel with the longitudinal length of the trailer 10.

Figure 2:
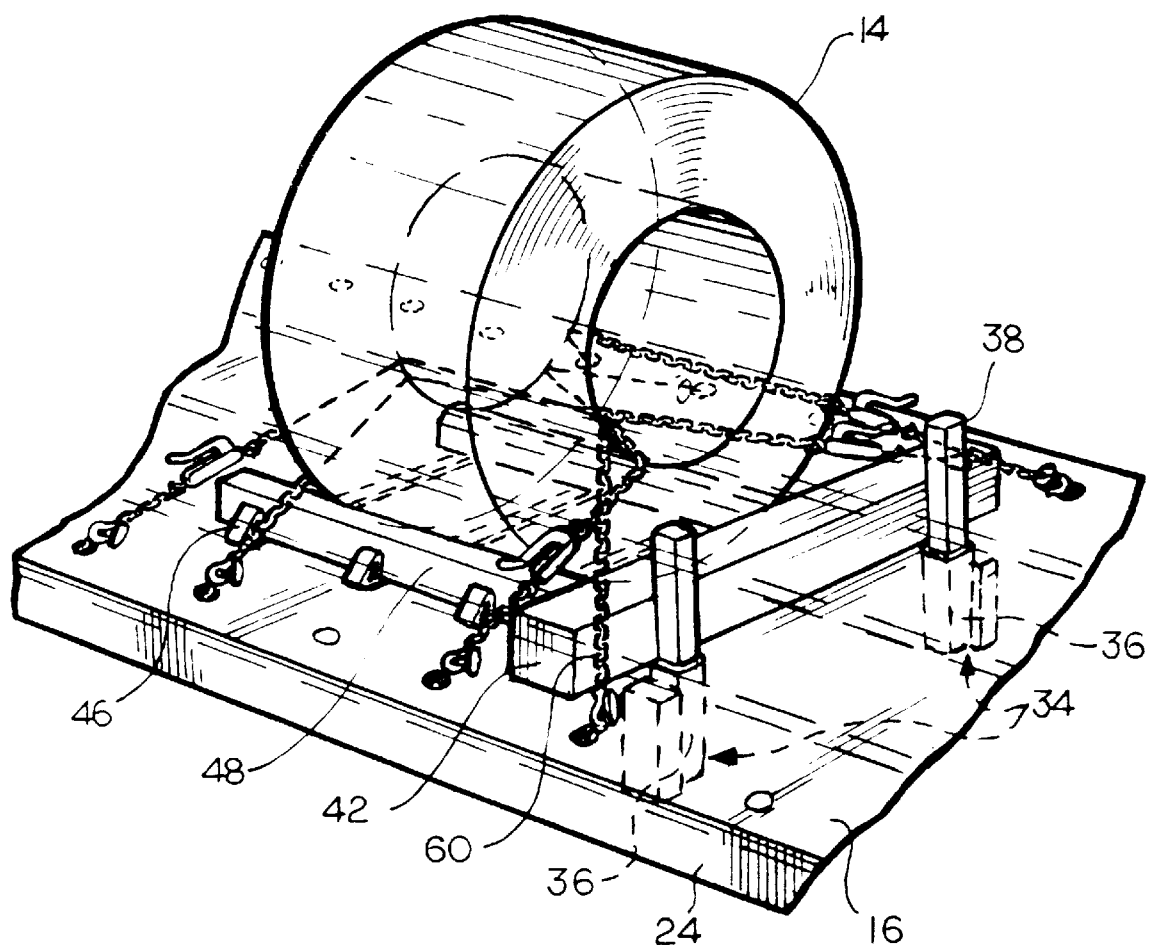
FIG. 2 is an enlarged fragmentary view of the steel coil stock of FIG. 1 secured to the trailer.
Figure 3:
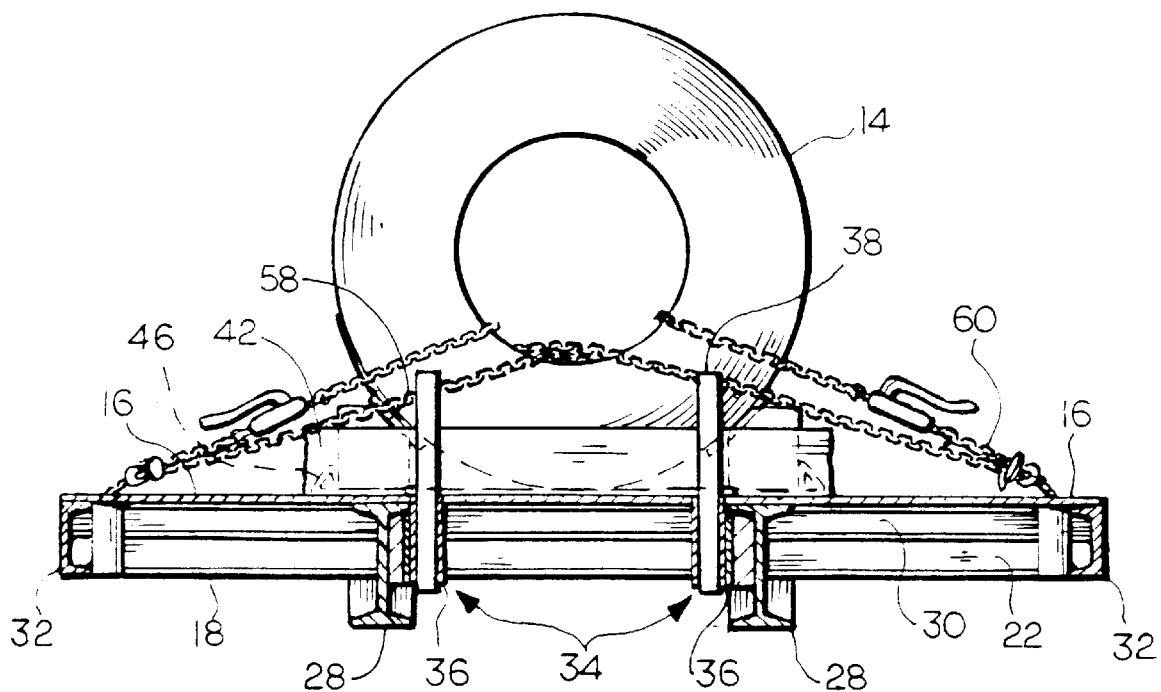
FIG. 3 is a cross sectional view of the trailer taken along line 3—3 of FIG. 1.

As shown in FIGS. 1–3, the trailer platform 16 is typically an elongated steel platform having opposed front 20 and rear 22 portions and a pair of opposed sides 24. In accordance with one embodiment of the present invention, the platform 16 may be generally flat, FIG. 3, or in accordance with another embodiment of the present invention, the platform may include a longitudinal recess 26 formed therein, FIG. 4.

The platform 16 is fastened to a structural frame 18 and cooperatively supported by the axles, wheels and suspension equipment previously described. The structural frame 18 includes a plurality of parallel steel beams 28 which are interconnected by steel channel cross beams 30 as well known in the art. Referring to FIGS. 1–4, the frame 18 generally includes two parallel spaced longitudinal intermediate I-beams 28 and two outer longitudinal channel beams 32 which form the sides 24 of the trailer 10. The front 20 and rear 22 portions of the frame 18 are also formed of steel channel cross beams.

Figure 6:
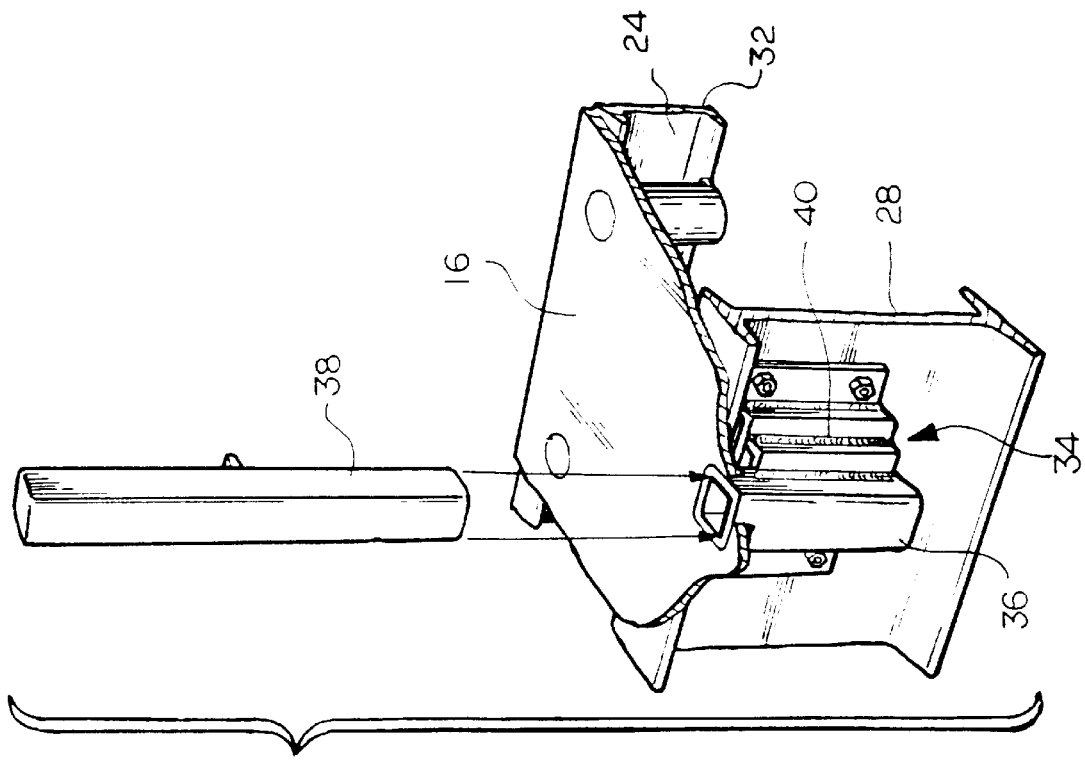
FIG. 6 is an enlarged fragmentary exploded view of a portion of the trailer in accordance with an alternative embodiment of the present invention.
Figure 5:
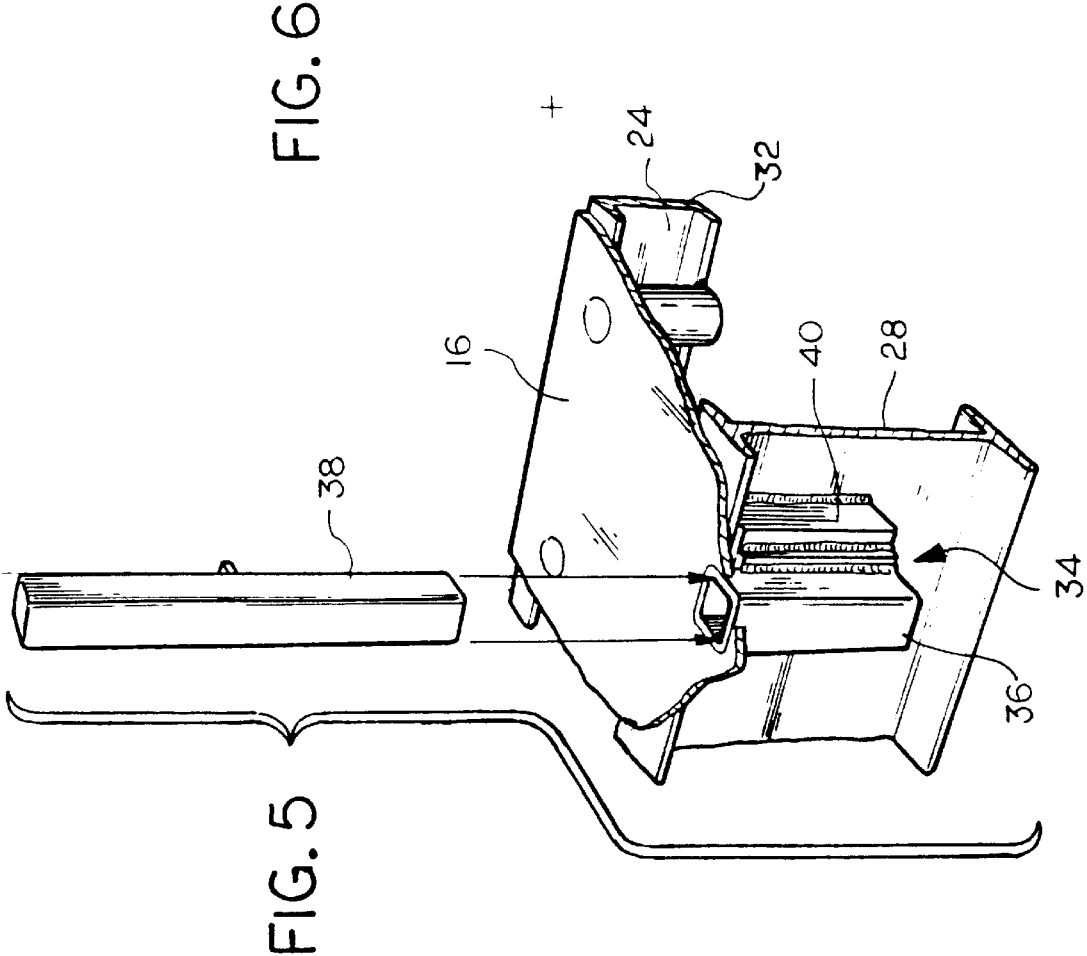
FIG. 5 is an enlarged fragmentary exploded view of a portion of the trailer in accordance with the present invention.

In accordance with the present invention, the platform 16 has a plurality of brackets 34 at spaced intervals along the longitudinal length of the inside edge of each intermediate I-beam 28. The brackets 34 may be attached to the I-beam 28 by welding or by fasteners and the like. As shown in FIGS. 5 and 6, each bracket 34 includes a support member 36 having an opening adapted to receive a removable post 38. The top surface of the support member 36 is positioned even with the top surface of the platform 16 and secured to a spacer member 40 to span the distance from the inside of the vertical member of the I-beam 28 to the support member such that the central axis of the opening is generally perpendicular to the platform. Forward movement of the coil stock 14 during sudden braking and the like may be prevented by positioning a cross piece block 42 between the coil stock 14 and two removable posts 38 installed within the support member 36 at equal distances from a front portion 20 of the trailer. Although the support member 36 is shown as a square post and the cross piece block 42 is shown as a rectangular cross sectional plank both extending against a portion of the coil stock 14, the support member and the cross piece block may be of most any size, shape and type of material sufficient to prevent or restrain forward movement of the coil stock.

The trailer 10 also includes means for restraining lateral movement of the coil stock 14 on the trailer. In accordance with one embodiment of the present invention, lateral movement of the coil stock 14 may be restrained by positioning a strap 46 having wedge shaped members on each end thereof below the coil stock. The length of the strap 46 may be varied as desired to accommodate coil stock of varying diameter. An appropriately sized block 48 having a complimentary rounded edge is positioned between each wedge shaped member and the rounded surfaces on each side of the coil stock 14 to form a cradle to receive the coil stock. It will be appreciated that the block 48 may be formed of any suitable material such as wood or rubber and the like as desired and of most any size to accommodate coil stock of varying diameter.

Figure 4:
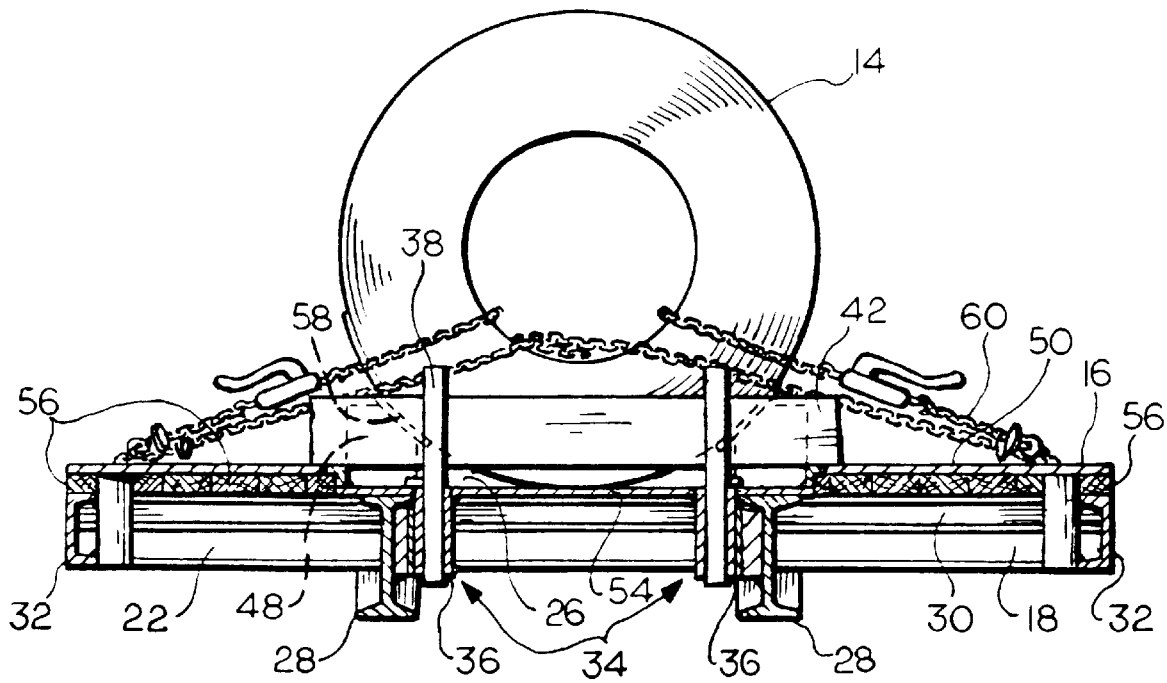
FIG. 4 is a cross sectional view of an alternative embodiment of the present invention.

In an alternative embodiment, as shown in FIG. 4, the outer side surface area 50 of the platform 16 may be raised thereby forming a recess 26 within the central surface area 54 of the platform. The outer side surface area 50 may be raised by lifting the outer side surface area of the platform 16 and positioning steel blocks or supporting structure 56 under the elevated platform. The blocks 48 as previously described may then be placed against the corners formed within the recess 26 between the elevated outer side area 50 of the platform 16 and the central area 54 of the platform. It will be appreciated that by utilizing the blocks 48 with the straps 46 or recess 26 the generally flat nature of the platform 16 of the trailer 10 is not dramatically altered such that other types of freight or coil stock size may be transported equally as well by merely removing the blocking and posts as required and/or substituting posts and blocks of an appropriate size.

If desired a rubber sheet material 58 may be positioned between each block 48 and the coil stock 14 to deter slippage of the coil stock and protect the surface of the coil stock.

To secure the coil stock 14 to the trailer platform 16, chain lengths 60 may be used as well known in the art and as shown in the figures. The chain lengths 60 pass through a cylindrical opening within the coil stock 14 and each end of the chain length is then attached to the platform 16. The chain lengths 60 may be securely tightened around the coil stock 14 using well known tensioning devices to hold the coil stock on the trailer platform 16.

Having described presently preferred embodiments of the invention, it is to be understood that it may be otherwise embodied within the scope of the appended claims.

What is claimed is:

1. A trailer for transporting a round coil stock, the trailer comprising:

a platform having a front, a rear and opposed sides;

a frame including at least two longitudinal parallel beams interconnected by a plurality of cross beams, said frame fastened to said platform and cooperatively supported by axles, wheels and suspension equipment;

at least two brackets spaced from said opposed sides of said platform and attached along the length of said parallel beams, each bracket of said at least two brackets spaced an equal distance from the front of said trailer and including a support member having an opening;

at least two removable posts, each removable post inserted in said opening of each support member;

a removable cross piece block disposed between said at least two removable posts and the coil stock, said cross piece block extending across said at least two removable posts;

a recess disposed within a central surface area of said platform and having elevated opposed sides; and at least two blocks, each block having a complimentary round edge capable of receiving a rounded side of the coil stock, each block disposed within said recess between one of said elevated sides of said recess and the coil stock, wherein said cross piece block, said at least two removable posts and said at least two brackets cooperatively prevent forward movement of the coil stock on the trailer, and wherein said recess and said at least two blocks cooperatively prevent lateral movement of the coil stock on the trailer.

2. The trailer of claim 1 further comprising a plurality of chain lengths, said chain lengths pass through a cylindrical opening within the coil stock and each end of said chain length is secured to said platform to secure the coil stock to said platform.

3. The trailer of claim 1 wherein said parallel beams are I-beams.

4. The trailer of claim 3 wherein said support member is secured to a spacer to span a distance from an inside of a vertical member of each I-beam to said support member.

5. The trailer of claim 3 wherein said at least two brackets are attached to said I-beam by welding.

6. The trailer of claim 3 wherein said at least two brackets are attached to said I-beam by fasteners.

7. The trailer of claim 2 wherein a top surface of said support member is positioned level with a top surface of said platform.

8. An apparatus for preventing lateral and forward movement of a round coil stock on a trailer, the trailer including a platform having a front, a rear and opposed sides, and a frame including at least two longitudinal parallel beams interconnected by a plurality of cross beams, the frame fastened to the platform and cooperatively supported by axles, wheels and suspension equipment, the apparatus comprising;

at least two brackets spaced from the opposing sides of the platform and attached along the length of the parallel beams, each bracket of said at least two brackets spaced an equal distance from the front of the trailer and including a support member having an opening;

at least two removable posts, each removable post inserted in said opening of each support member;

a removable cross piece block disposed between said at least two removable posts and the coil stock, said cross piece block extending across said at least two removable posts;

a recess disposed within a central surface area of said platform and having elevated opposed sides; and at least two blocks having a complimentary round edge capable of receiving a rounded side of the coil stock, each block disposed within said recess between one of said elevated opposed sides of said recess and the coil stock, wherein said cross piece block, said at least two removable posts and said at least two brackets cooperatively prevent forward movement of the coil stock on the trailer, and wherein said recess and said at least two blocks cooperatively prevent lateral movement of the coil stock on the trailer.

9. The trailer of claim 8 further comprising a plurality of chain lengths, the round coil stock having a cylindrical opening wherein said chain lengths pass through the cylindrical opening and are secured to the platform to secure the coil stock to the platform.

10. The trailer of claim 8 wherein a top surface of said support member is positioned level with a top surface of said platform.

11. The trailer of claim 8 wherein said parallel beams are I-beams and said support member is secured to a spacer to span a distance from an inside of a vertical member of each I-beam to said support member.

* * * * *